US005210772A

United States Patent [19]

Nakagawa

[11] Patent Number: 5,210,772

[45] Date of Patent: May 11, 1993

[54] APPROXIMATE FIGURES MEASURING SYSTEM

[75] Inventor: Yoshikatsu Nakagawa, Yamato, Japan

[73] Assignee: Ricoh Company, Ltd., Tokyo, Japan

[21] Appl. No.: 663,301

[22] Filed: Mar. 1, 1991

[30] Foreign Application Priority Data

Mar. 16, 1990 [JP] Japan .................................. 2-63955

[51] Int. Cl.5 ............................................ H04L 27/30

[52] U.S. Cl. ........................................ 375/1; 380/34; 342/27; 342/189; 342/192; 340/933

[58] Field of Search ............................... 340/933, 934

[56] References Cited

U.S. PATENT DOCUMENTS

| | | | |
|---|---|---|---|
| 3,518,674 | 6/1970 | Moorehead et al. | 342/457 |
| 3,714,573 | 1/1973 | Grossman | 375/1 X |
| 4,797,675 | 1/1989 | Ovaska | 342/28 |
| 4,870,663 | 9/1989 | Kulju et al. | 342/28 X |

FOREIGN PATENT DOCUMENTS 3-71300 3/1991 Japan .

OTHER PUBLICATIONS

"An Asynchronous Multi-Channel SSC Transceiver Using a Saw Convolver", IEICE, Japan; Mar. 22, 1989; SSTA89-9, pp. 59-66.

"Urban Information Service", J. IEE Japan; vol. 109, No. 2, 1989; pp. 119 through 126.

R. C. Dixon, *Spread Spectrum Systems*; (John Wiley & Sons; 1984; pp. 44-47).

*Primary Examiner*—Bernarr E. Gregory

*Attorney, Agent, or Firm*—Oblon, Spivak, McClelland, Maier & Neustadt

[57] ABSTRACT

An approximate figures measuring system includes a signal transmission device and a signal receiving device. The signal transmission device is arranged in each of any objects to be measured and emits a signal from which a peak can be generated at a receiving device in a predetermined period. The signal receiving device receives the signal transmitted from the signal transmission device and includes a peak detection circuit and a calculation circuit for obtaining an output corresponding to the number of the peaks of the signals from the objects.

14 Claims, 10 Drawing Sheets

APPROXIMATE FIGURES MEASURING SYSTEM

BACKGROUND OF THE INVENTION

1. Field of the Invention

The present invention relates to a system for measuring approximate figures of, for example, people or cars for indicating a degree of a traffic jam state.

2. Description of the Related Art

There is proposed a system for indicating a state of a traffic jam to control the traffic flow wherein the traffic state is monitored by a TV camera which is set aside the road or wherein the vehicle number or speed of the vehicle is measured from the TV camera by processing the video signal thereof.

Such a system is disclosed, for example, in the Electric Society Report No. 109, 1989, "IV. Municipal Information Service", page 121 to 122, Chapter 1 "2. Traffic Information System".

However, the area which can be covered by one TV camera is limited. Therefore, a plurality of cameras are required to cover the wide area of a traffic state, which makes the system complicated and expensive.

Another traffic monitoring system is such that a traffic counter comprising a supersonic sensor is set on the road to count the numbers of vehicles passing over the sensor. However, in the event of a traffic jam, the detection signal from the sensor is discriminated as if the numbers of vehicles are very small.

The applicant has already filed "System for measuring jam of objects" prior to this application at the Japanese Patent Office, numbered Japanese Laying Open Patent Application No. 3-71300. According to the system of the prior application, the jam degree is measured in such a way that a transmission device is arranged for measuring the objects so that the jam degree is determined from the level of white noise which is transmitted from the transmission device and has a limited band.

However, the sensor of the system is also responsive to the white noise generated from vehicle engines, which impairs the accuracy of the measurement.

SUMMARY OF THE INVENTION

It is therefore an object of the present invention to provide an approximate figures measuring system for indicating in round numbers cars on the road or people gathered in restaurants, shopping houses or exhibition places, which system is composed of a relatively simple construction and not influenced from the white noise generated from engines and which system is able to determine the degree of jam or crowdedness by comparing the measured round numbers with a predetermined reference number, if necessary.

Also, it is another object of the present invention to provide an approximate figures measuring system for indicating the round numbers with respect to every kind of the objects to be measured.

The above mentioned object of the present invention can be achieved by an approximate figures measuring system comprising:

a signal transmission device arranged in each of the objects to be measured for emitting a signal from which a peak can be generated in a predetermined period; and a signal receiving device for receiving the signal transmitted from the signal transmission device and comprising a peak detection circuit and a calculation circuit for obtaining an output corresponding to number of the peaks of the signals from the objects.

An advantage of the present invention is that it becomes possible to reliably discriminate, for example, the traffic conditions from the approximate figures of people or cars, for example, without being influenced from the white noise from the vehicle engines.

Also, another advantage of the present invention is that it becomes possible to obtain the approximate figures for respective kinds of objects to be measured, such as pedestrians and cars.

Further objects and advantages of the present invention will be apparent from the following description of the preferred embodiments of the invention as illustrated in the accompanying drawings.

DESCRIPTION OF THE PREFERRED EMBODIMENTS

In accordance with the present invention, an arrangement is made in such away that a PN signal generator is arranged as a transmission device for each of the objects for which approximate figures are to be measured and that a receiving device is arranged so as to obtain the number of the self-correlation (autocorrelation) peaks of the PN signal to obtain the approximate figures of the object to be measured.

Also, it is possible to obtain the approximate figures of the object from the sum of the self-correlation levels of the PN signal in the receiving side. Further, it is possible to shape the waveform of the self-correlation output of the PN signal as a pulse series and integrate the pulses for one cycle of the PN signal so as to obtain the approximate figures of the object.

Further, it is possible to obtain the approximate figures for each sort of the objects by arranging a specific PN signal generator of a different group for each sort of the objects so that the approximate figures are determined from each PN signal from the different groups.

Signals other than the PN signal can be used for determining the approximate figures of the object. For example, the approximate figures can be obtained in such a way that FM chirp signal generators having a specific chirp ratio are arranged for respective objects to be measured and that in the signal receiving side the pulses are counted in the signal transmission cycle T which pulses are made by pulse-compression of the FM chirp signal through a chirp filter.

One method for measuring the approximate figures of the object is such that a pulse-like signal is transmitted from the object at a predetermined cycle ratio such as one time per a predetermined cycle period T and that in the signal receiving side the pulses received in the period T are counted or the total pulse signal energy in the period T is divided by the energy of one pulse to obtain the number of the objects. Considering that at least a part of the pulse-like signal may be overlappingly transmitted to the signal receiving side at the same time, the above mentioned method gives the approximate figures of the object.

In accordance with a first measuring system of the present invention, a PN signal is used as a signal transmitted from the object to be measured. The PN signal is in itself a signal used for transmitting information and used as a pseudo noise code in the SSC (Spread Spectrum Communication) as disclosed in "Asynchronous multichannel SSC transceiver using SAW convolver" the Electronic Information and Communication Society, the spectrum diffusion communication and its applied communication document SSTA89-9, Mar. 22, 1989, chapter 1 to 2.

Figure 3A:
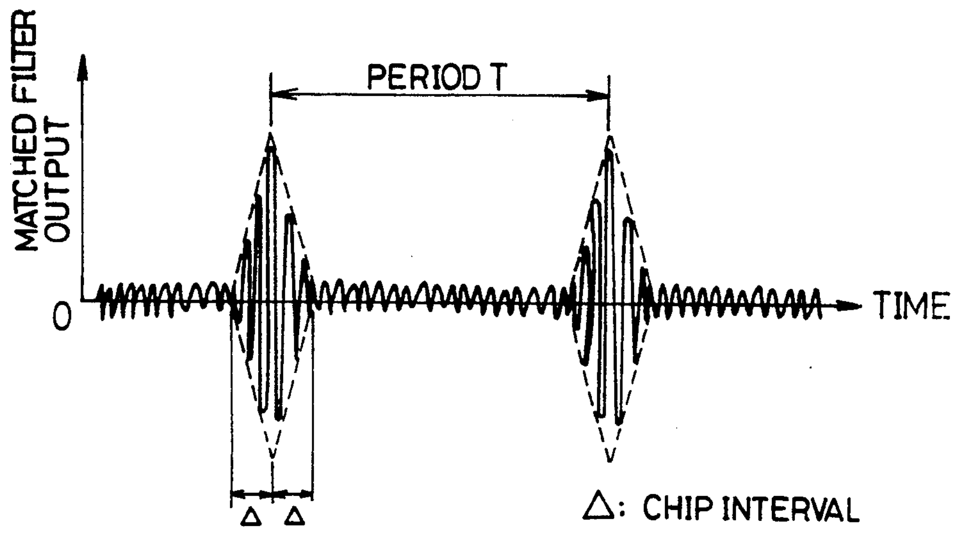
FIGS. 3*a* and 3*b* are explanatory views for explaining the generation of pulses used in the present invention.

The PN signal modulated by the PN code has an autocorrelation characteristic which generates one correlation peak during one period T of the PN signal as illustrated in FIG. 3*a* by a matched filter. It is to be noted that the width 2Δ of the correlation peak is twice as large as the length of one chip of the PN signal as illustrated in FIG. 3*a*.

Therefore, it is clear that the approximate figures can be obtained in such a way that a PN signal generator of a specific signal group is arranged for each of the objects to be measured and that upon receipt of the PN signals from the objects, the numbers of the autocorrelation peaks of the signals are counted to determine the approximate figures.

It is possible to obtain the approximate figures for each of the sorts of objects by such a way that a PN signal generator of a different signal group is arranged for each sort of the objects and that the peak numbers are counted for every sort of object, respectively.

Also, another way for obtaining the approximate figures of the present invention is such that upon receipt of the PN signals from the objects, the sum of the autocorrelation levels is calculated. The sum of the autocorrelation level is equivalent to the total energy of the signals in one period T of the autocorrelation peak of the PN signal.

Further, it is possible to heighten the reliability of measurement of the approximate figures by shaping the waveform of the autocorrelation output of the PN signal to form a pulse series and integrating the pulses for one period of the PN signal.

In accordance with a second system for measuring the approximate figures of objects, an FM chirp signal generator of a specific chirp ratio is arranged for each of the objects to be measured. As illustrated in the upper graph of FIG. 3*b*, the FM chirp signal changes its frequency from low to high in one predetermined period R and this frequency change is repeated at an interval of one time per one period T wherein T is larger than R, as illustrated in the graph.

An FM chirp filter is arranged in the signal receiving side. The filter applies a long delay time to a low frequency signal while it applies a short delay time to a high frequency signal. The filter may be composed of, for example, a surface acoustic wave (SAW) delay element as disclosed in "Acoustic Waves", by G. S. Kino, (Prentice-hall 1987) page 332 to 333.

Figure 3B:
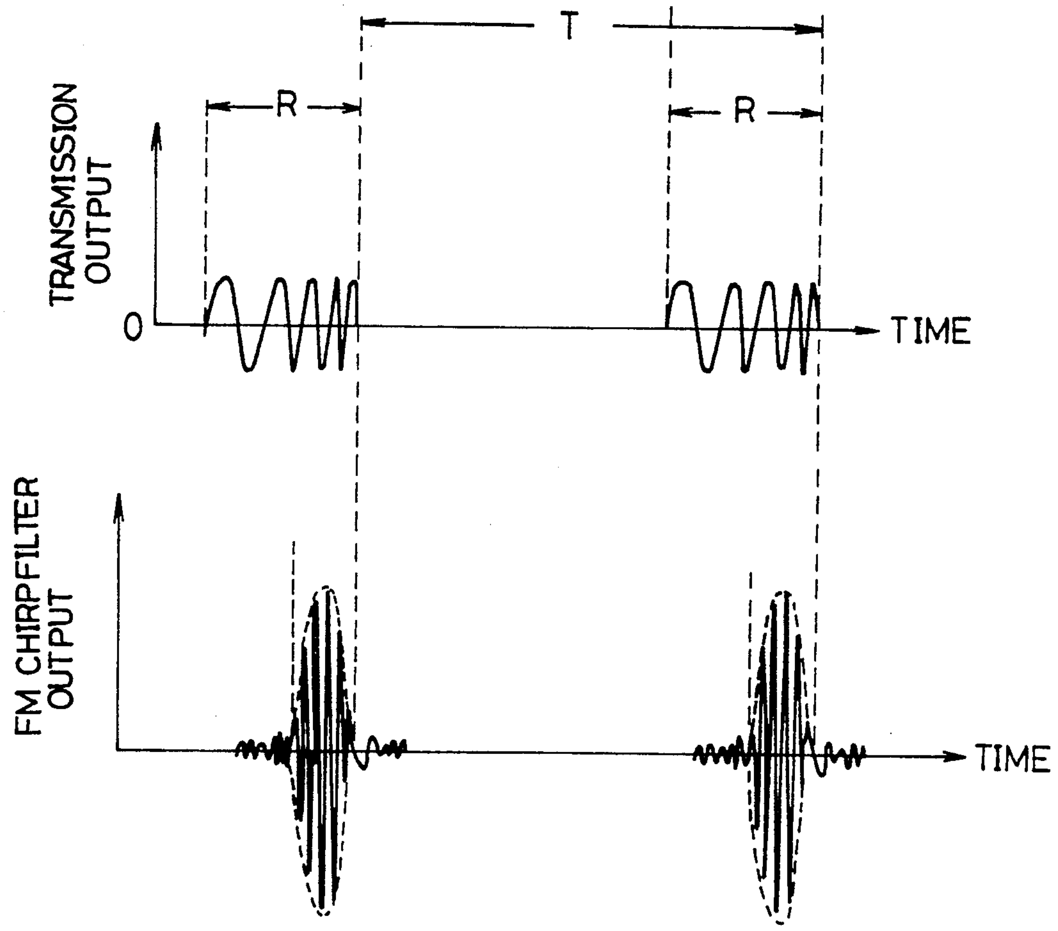

Therefore, when the FM chirp signal passes through the filter, the width of the signal in the period R is compressed to form a pulse of a narrow width as illustrated in the lower graph of FIG. 3*b*, since the low frequency signal component in the first part of the period R is delayed longer than the high frequency signal component in the last part of the period R so that the signal in the first part comes close to the signal in the last part of the period R. The envelope line of the compressed FM chirp signal forms a pulse. Accordingly, the width of the pulse becomes narrow. As a result, it becomes possible to individually count the pulses even if the FM chirp signals are transmitted almost at the same time from the respective objects.

Embodiments in which the present invention is used for detecting traffic conditions are described hereinafter.

Figure 1:
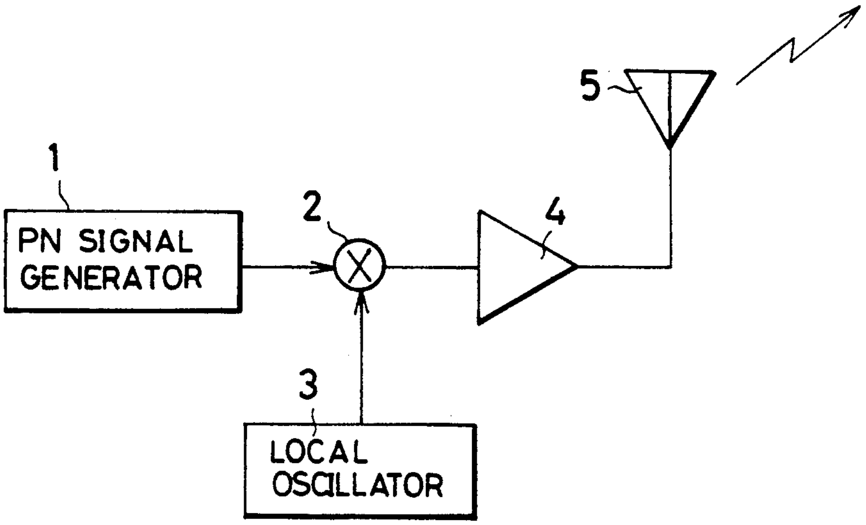
FIG. 1 is a block diagram of an embodiment of the transmission device arranged for measuring objects in accordance with the present invention.

FIG. 1 illustrates a transmission device which is carried by each of respective people as objects to be measured or arranged in each of the cars to be measured. The device comprises a PN signal generator 1, a mixer 2, a local oscillator 3, an amplifier 4 and an antenna 5. The generator 1 outputs a PN signal of a specific group. The PN signal is mixed in the mixer 2 with a high frequency local oscillator signal generated from the oscillator 3 and converted to a signal having a frequency band of 800 to 900 MHz, for example, which does not disturb the other wireless communications. The signal output from the mixer 2 is amplified by the amplifier 4 and emitted from the antenna 5.

It is to be noted that the band of the PN signal is dependent on the clock frequency of the PN signal. Therefore, it is desirable to choose a clock frequency of several tens to several hundreds KHz so as to prevent the signals of adjacent channels from intruding into the band of PN the signal. Also, as to the PN signal, it is desirable to use an M group signal which has a small side lobe of self-correlation characteristic as disclosed "Spectrum Diffusion Communication System", page 397, Kagaku Gijutsu Publishing Company, 1988.

It is also desirable that the antenna 5 have a band range wide enough to transmit the PN signal of the above mentioned frequency band and a wide beam angle so as to certainly transmit the signal toward the receiving device, the direction of which changes as the transmission device moves. Further, it is desirable that the output power of the transmission devices be substantially the same so that signals of the same intensity are transmitted to the receiving device from the transmission devices.

In the event that the area to be measured is relatively narrow so that the distance between the receiving device and each transmission device can be regarded as being almost constant, the power of the signals transmitted from the transmission devices become substantially the same by arranging the output power of the transmission devices as being the same.

Therefore, it becomes possible to regard the energy of the received correlation peaks as being the same also. Therefore, by integrating the correlation peaks, it becomes possible to obtain an output in proportion to the number of the above mentioned correlation pulses' which number corresponds to the approximate figures of the PN signals transmitted from the area to be measured, whereby the approximate figures of the object to be measured can be obtained.

Figure 2:
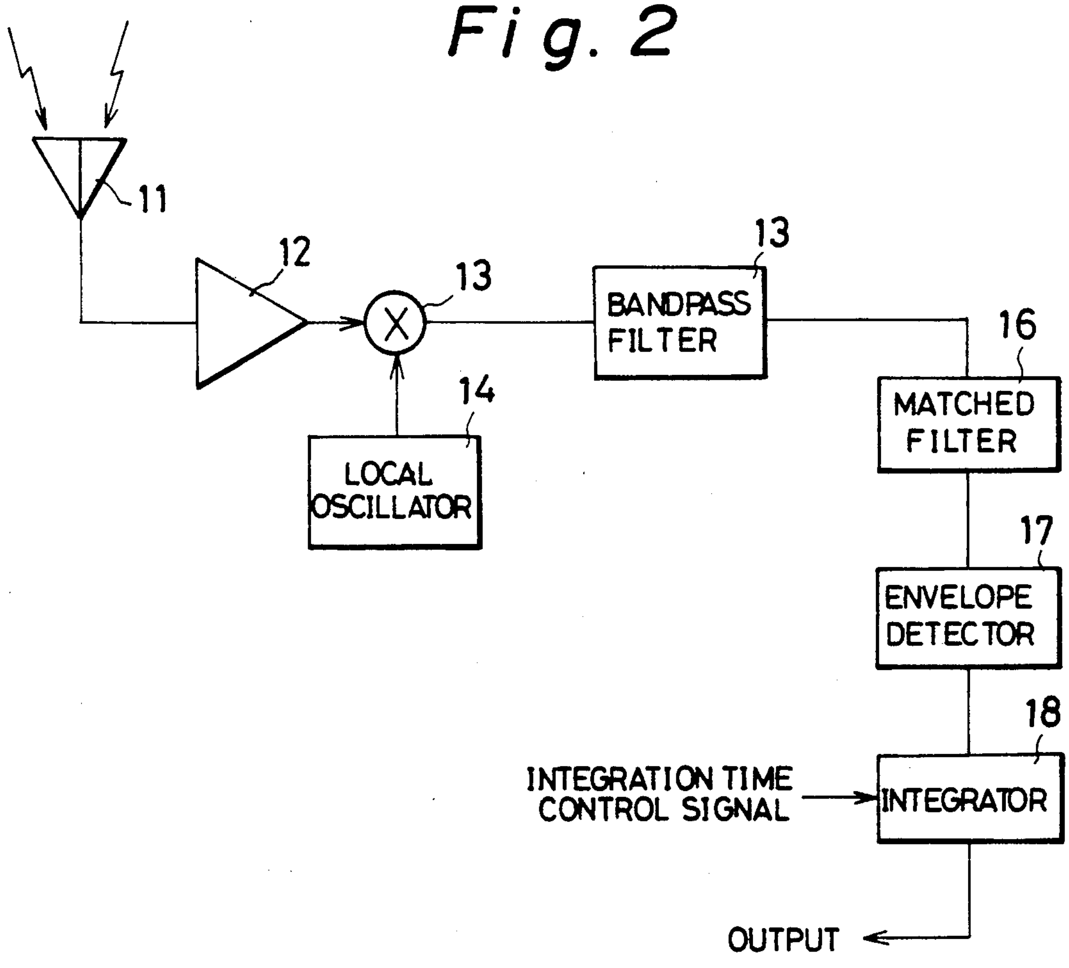
FIG. 2 is a block diagram of an embodiment of the receiving device arranged for obtaining the approximate figures of the objects by integrating the relative pulses.

FIG. 2 illustrates a structure of the receiving device for obtaining the approximate figures by integrating the correlation pulses in accordance with the present invention as mentioned above.

The receiving device comprises an antenna 11, an amplifier 12, a mixer 13, a local oscillator 14, a bandpass filter 15, a matched filter 16, an envelope detector 17 and an integration circuit 18. The above mentioned PN signal is received through the antenna 11 and amplified by the amplifier 12. After that, the signal is mixed with a signal generated from the local oscillator 14 in the mixer 13 and converted to a signal having an appropriate frequency band. The signal then passes through the bandpass filter 15 wherein noise components and undesirable signal components other than the PN signal component are removed from the signal. After that, the signal is introduced to the matched filter 16 which is composed of, for example, a delay element comprising an SAW convolver as mentioned above.

The filter 16 asynchronously detects the PN signal and outputs a signal as illustrated in FIG. 3*a* which includes one correlation peak in one period. The envelope component of the signal output from the filter 16 is taken by the envelope detector 17 and transmitted to the integrator 18.

Figure 4:
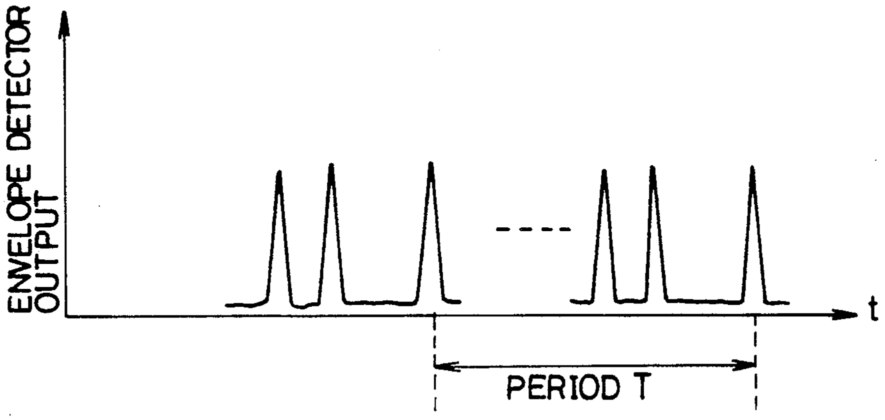
FIG. 4 is a graphical view of an example of envelope line output of correlation peaks of pulses.

FIG. 4 illustrates an example of the output signal from the envelope detector 17 when a plurality of correlation peaks are transmitted thereto from the objects.

The integrator 18 integrates the correlation pulses of the PN signal for one period T in accordance with the integration time control signal to obtain an output voltage which is in proportion to the number of the pulses, that is, the number of the objects to be measured.

It is to be noted that if the difference of phase between the signals from the objects is less than $\pm 1$ chip of the PN signal, the PN signals interfere with each other, which results in the fading of the signals so that the correlation peaks thereof are deleted. Therefore, it is desirable that if the assumptive number of the objects to be measured is, for example, 100, the period T be set as $T > 100$ chips.

When the movement of the objects to be measured is slow so that the output from the filter 16 can be regarded as being constant during the period of several times as long as the above mentioned period T, it is desirable that the integration time be elongated to nT from T, multiplying the period T by a whole number n, so as to heighten the accuracy of the measurement.

On the other hand, when the movement of the objects is fast and the objects so into and out of the area to be measured very frequently, it becomes necessary to shorten the integration time to less than the period T.

Figure 5:
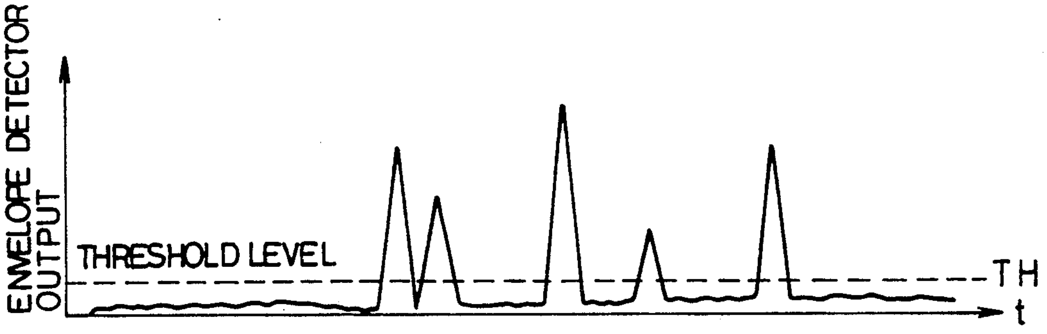
FIG. 5 is a graphical view of correlation peak outputs in relation to the threshold level.

It is to be noted that in the event wherein the area to be measured is very large, the power of the signal transmitted from the transmission device is attenuated due to the diffusion of the signal and changes according to the position of the transmission device. Therefore, the output level of the correlation peak becomes different for each transmission device. FIG. 5 illustrates the output signal of the receiving device which receives such different level signals from the transmission devices of the objects. Therefore, the accuracy of measuring the approximate figures is reduced in accordance with the above mentioned integration method wherein the correlation peaks are to be integrated.

Figure 6:
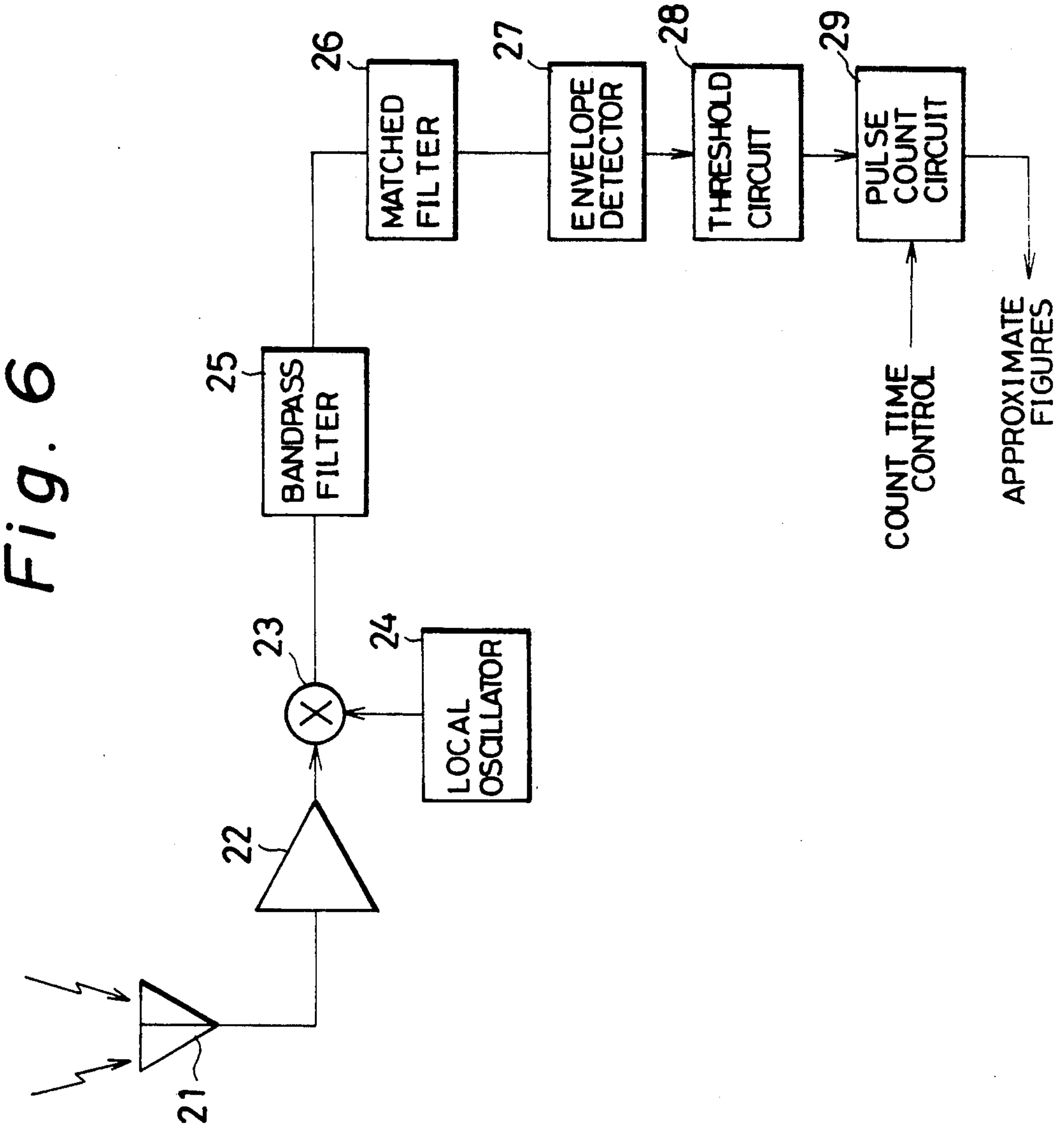
FIG. 6 is a block diagram of another embodiment of the receiving device which detects the number of correlation peaks.

FIG. 6 illustrates another embodiment of the signal receiving device in accordance with the present invention. In this embodiment, the correlation peaks in one period T are counted instead of being integrated by the integrator 18 of the first embodiment mentioned before. By counting the peaks, it becomes possible to raise the accuracy of measuring the approximate figures even when energy levels of the peaks are different, respectively.

The signal receiving device of FIG. 6 comprises an antenna 21, an amplifier 22, a mixer 23, a local oscillator 24, a bandpass filter 25, a matched filter 26, an envelope detector 27, a threshold circuit 28 and a pulse count circuit 29. The circuit structure from the antenna 21 to the envelope detector 27 is substantially the same as that of the first embodiment of FIGS. 1 to 3. In accordance with the embodiment of FIG. 6, the output of the detector 27 is transmitted to the threshold circuit 28.

In the circuit 28, as illustrated in FIG. 5, correlation peaks are discriminated by the threshold level TH and counted by the circuit 29 for the period of T mentioned above so as to obtain the approximate figures.

It is to be noted that in order to prevent the shape of the pulses output from the circuit 28 from influencing the counting function of the circuit 29, a pulse shaping circuit may be disposed between the circuits 28 and 29.

Figure 7:
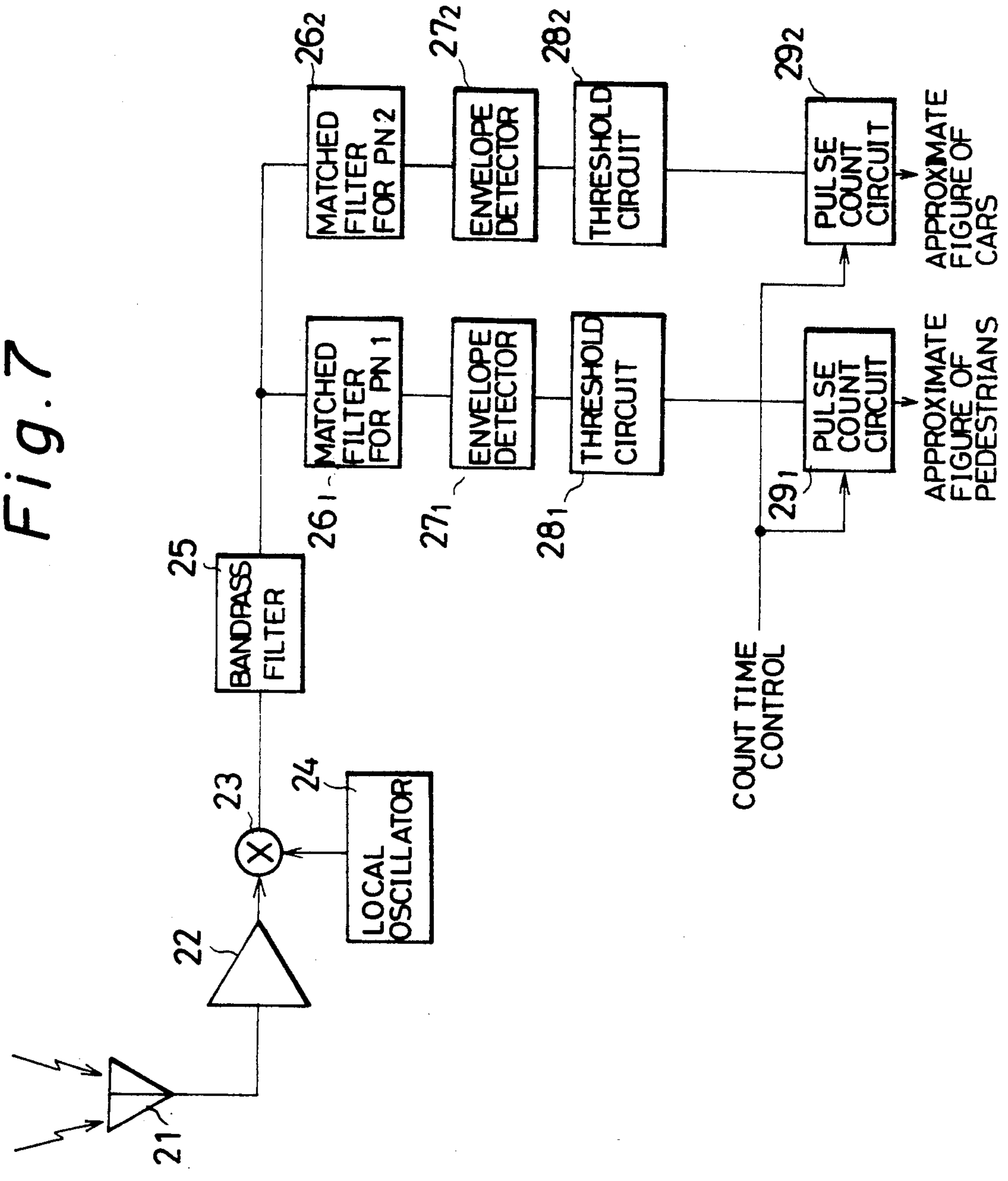
FIG. 7 is a block diagram of still another embodiment of the receiving device which sorts the objects to be measured and detects the approximate figures for each of the sorts.

FIG. 7 illustrates a still other embodiment of the signal receiving device in accordance with the present invention wherein the objects to be measured are sorted to, for instance, pedestrians and cars and the approximate figures are measured for each sort of the objects.

In this embodiment, PN signals of different groups such as $PN_1$, $PN_2$ are arranged for different sorts of object, respectively. Also, the matched filters $\mathbf{26}_1$ and $\mathbf{26}_2$ are arranged for respective groups. Each measuring circuit for counting the approximate figures of each sort of object comprises the detectors $\mathbf{27}_1$,$\mathbf{27}_2$ connected from the filter $\mathbf{26}_1$, $\mathbf{26}_2$, the threshold circuit $\mathbf{28}_1$, $\mathbf{29}_2$ and the pulse count circuit $\mathbf{29}_1$, $\mathbf{29}_2$, so as to perform the counting operation for each sort of object in the same manner as the circuit of FIG. 6.

However, in accordance with the measuring system by integrating the correlation peaks mentioned before, the measurent result is influenced from the power of the signal which is transmitted to the signal receiving device from the signal transmission device. Also, in accordance with the measuring system by counting the correlation peaks mentioned above, count errors may occur when a plurality of PN signals are simultaneously transmitted from the objects.

However, it is possible to obviate such problems and raise the reliability of measurement by shaping the output from the envelope detector to form a pulse series and integrating the pulses.

Figure 8:
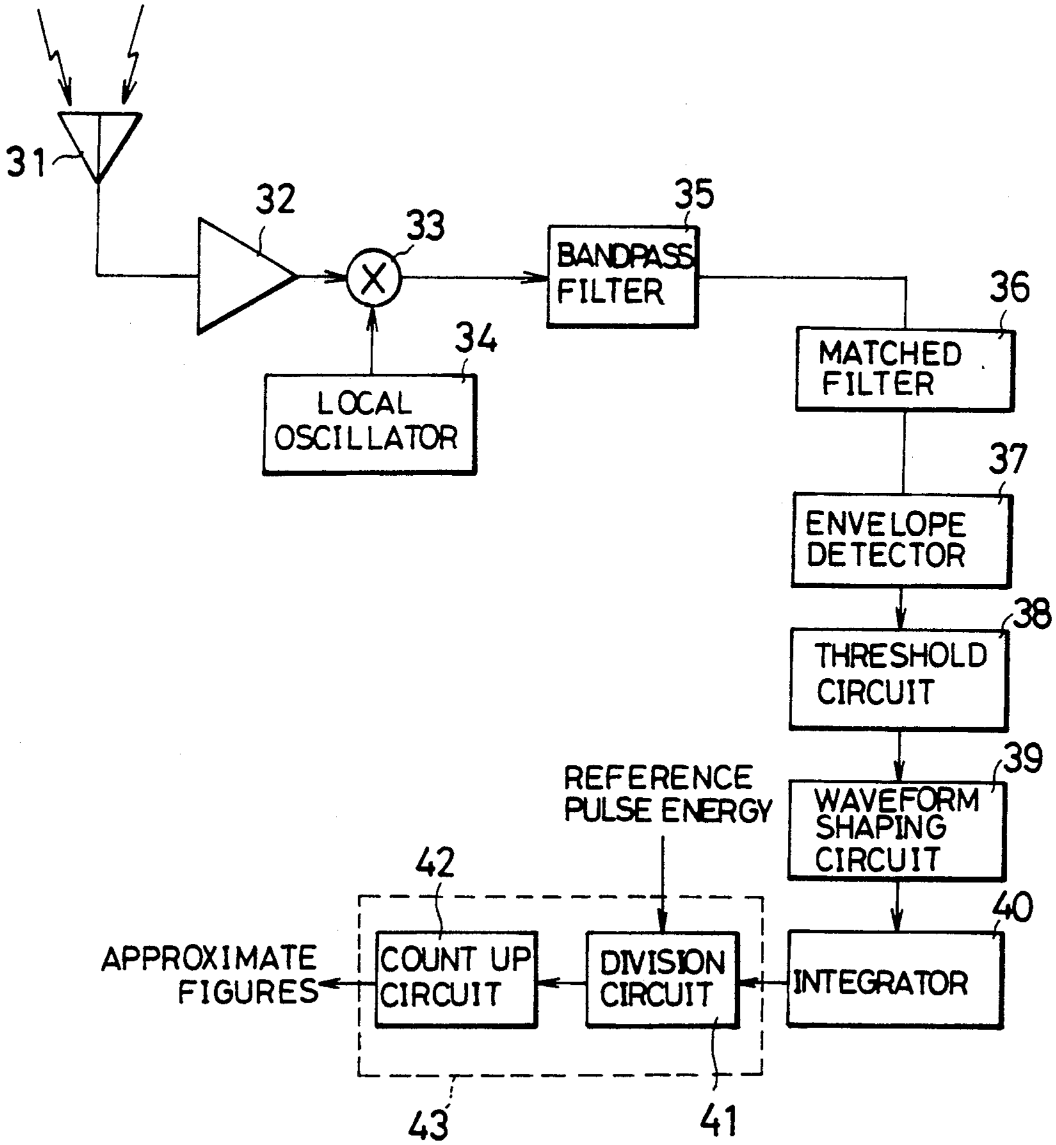
FIG. 8 is a block diagram of a further embodiment of the receiving device in accordance with the present invention.

FIG. 8 illustrates a further embodiment of the signal receiving device in accordance with the present invention in which the above mentioned improvement is made.

The embodiment of FIG. 8 comprises an antenna 31, an amplifier 32, a mixer 33, a local oscillator 34, a bandpass filter 35, a matched filter 36, an envelope detector 37 and a threshold circuit 38 which are arranged in the same manner as the embodiment of FIG. 6. The embodiment of FIG. 8 further comprises a waveform shaping circuit 39 connected to the threshold circuit 38, an integrator 40, a divisional circuit 41 and a circuit 42 for counting fractions lower than the decimal point as a whole number. The circuits 41 and 42 constitute a calculator 43 for calculating the approximate figures of the objects. A reference integration value is input to the circuit 41 for the calculation.

Figure 9:
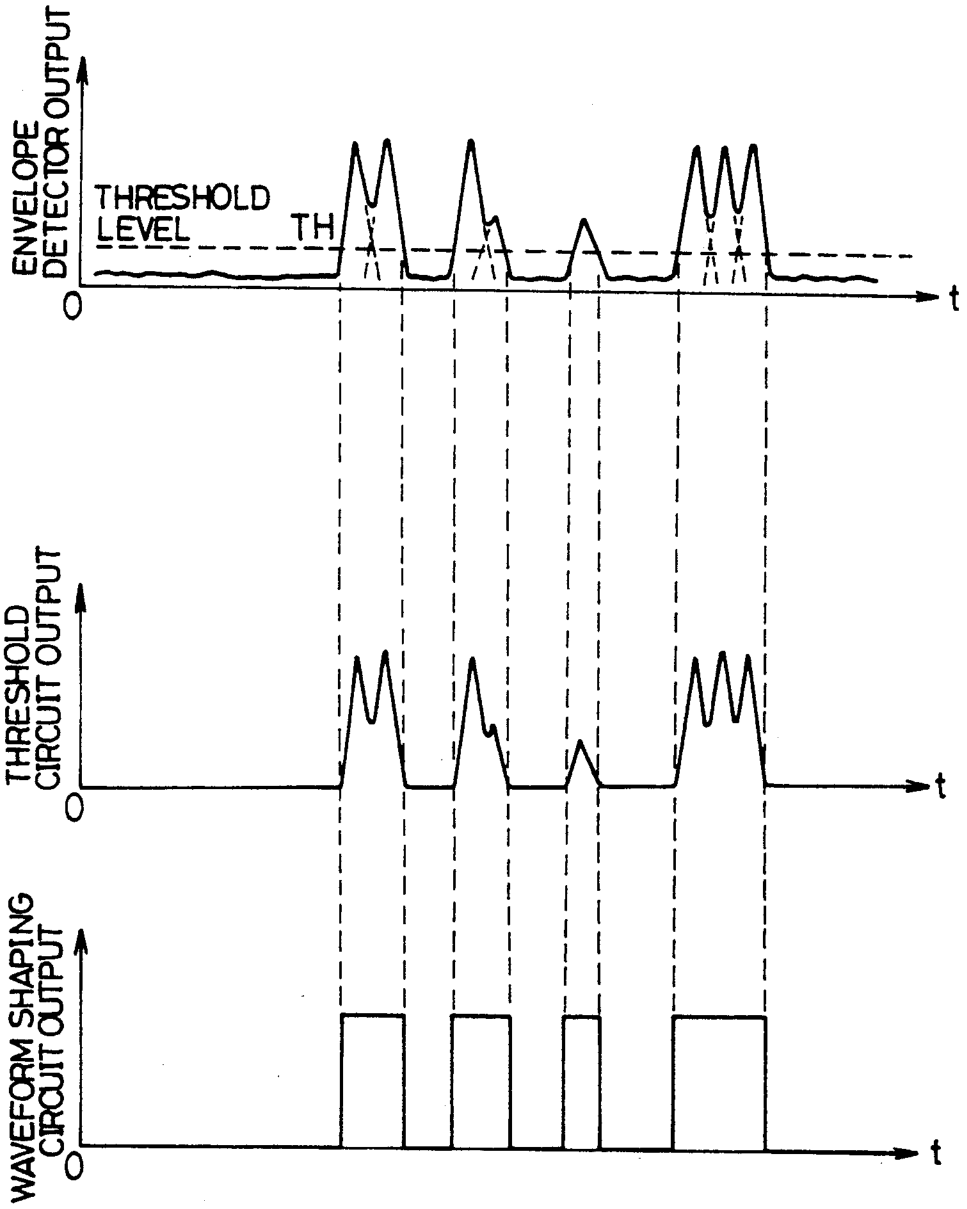
FIG. 9 is an explanatory view for explaining the envelope line waveform of the receiving side when a plurality of PN signals are simultaneously transmitted from the transmission device.

A graph relating to envelope detector of FIG. 9 represents an output signal from the detector 37 when a plurality of PN signals are overlappingly transmitted from the objects so that the width of each pulse is widened in appearance.

A graph relating to threshold circuit output of FIG. 9 represents an output signal from the circuit 38 which detects the correlation peaks of the pulses which are over the threshold level TH when the pulse signal of graph (a) is input thereto.

A graph relating to waveform shaping circuit output of FIG. 9 represents an output signal from the circuit 39 which shapes the pulse signal of graph (b) transmitted from the circuit 38 to form a rectangular pulse series. Each of the rectangular pulses is widened when a plurality of PN signals are overlappingly transmitted from the objects. Therefore, by integrating the rectangular pulses, it becomes possible to obtain an output which is in proportion to the approximate figures of the objects.

The output from the integrator 40 does not directly indicate the number of the objects. However, it is possible to calculate the number of the objects by dividing the output from the integrator 40 by the reference integration value which corresponds to the output value for one object. Such a divisional calculation is carried out by the circuit 41.

Further, it becomes possible to raise the accuracy of the measurement of the approximate figures by counting the fractions lower than the decimal point as a whole number by the circuit 42 connected to the divisional circuit 41 so that the reduction of the width of the pulse which is constituted from a plurality of PN signals is compensated.

A still further embodiment of the present invention is described with reference to FIGS. 10 to 15 hereinafter.

In this embodiment, the signal transmission device transmits an FM chirp signal.

As described with reference to FIG. 3*b*, the FM chirp signal changes its frequency from low to high in a predetermined period R. The frequency changing period R is repeated at an interval of once a period of T wherein T>R.

Figure 10:
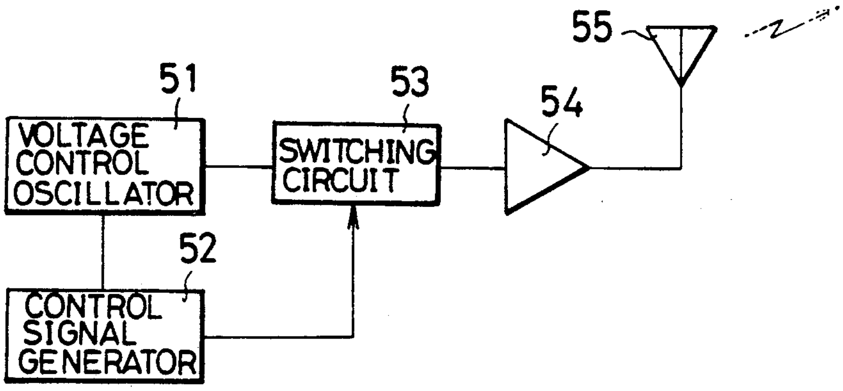
FIG. 10 is a block diagram of another embodiment of the transmission device which transmits an FM chirp signal in accordance with the present invention.

FIG. 10 illustrates the structure of the signal transmission device that emits the FM chirp signal.

The device comprises a voltage control oscillator 51, a control signal generator 52, a switching circuit 53, an amplifier 54 and an antenna 55. The oscillator 51 comprises a voltage controlling variable capacity diode as a tuning element for determining the oscillation frequency.

Figure 11:
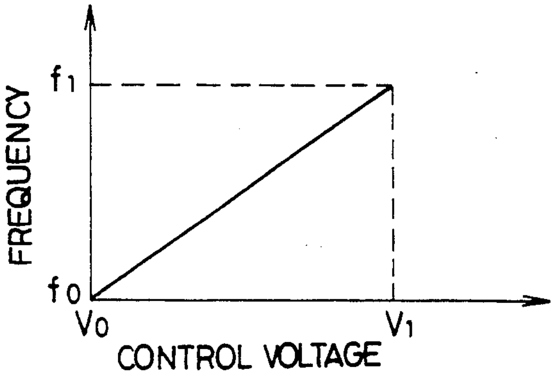
FIG. 11 is a graphical view of the frequency of the generated signal in relation to the controlling voltage of the variable capacity diode for controlling the voltage.

FIG. 11 illustrates the characteristic of the above mentioned diode of the oscillator 51. As can be seen from the graph of FIG. 11, when the controlling voltage applied between the terminals of the diode is changed from $V_0$ to $V_1$, the oscillation frequency linearly changes from $f_0$ to $f_1$.

Figure 12:
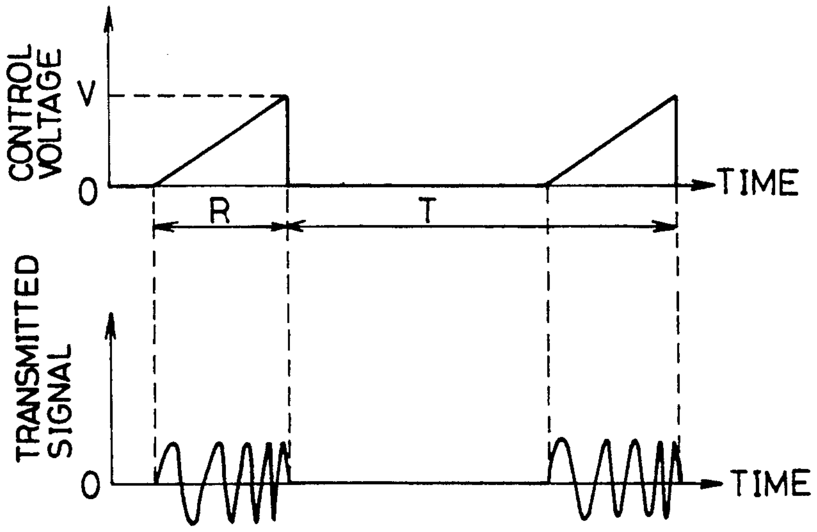
FIG. 12 is an explanatory view for explaining the controlling voltage and the FM chirp signal generated by the voltage.

The control signal generator 52 supply the voltage control oscillator 51 with a controlling voltage which linearly changes from 0 to V in a predetermined period R as illustrated in the graph (a) of FIG. 12. Receiving the voltage of the graph (a) from the generator 52, the oscillator 51 outputs an oscillation signal, the frequency of which continuously changes from $f_0$ at first to $f_1$ at the end of the period R, as illustrated in the graph (b) of FIG. 12. The generator 52 also outputs a control signal to the switch circuit 53 so that the circuit 53 is turned on for the period of R.

The FM chirp signal generated as mentioned above is amplified by the amplifier 54 and emitted through the antenna 55 which is desirably nondirectional.

Figure 13:
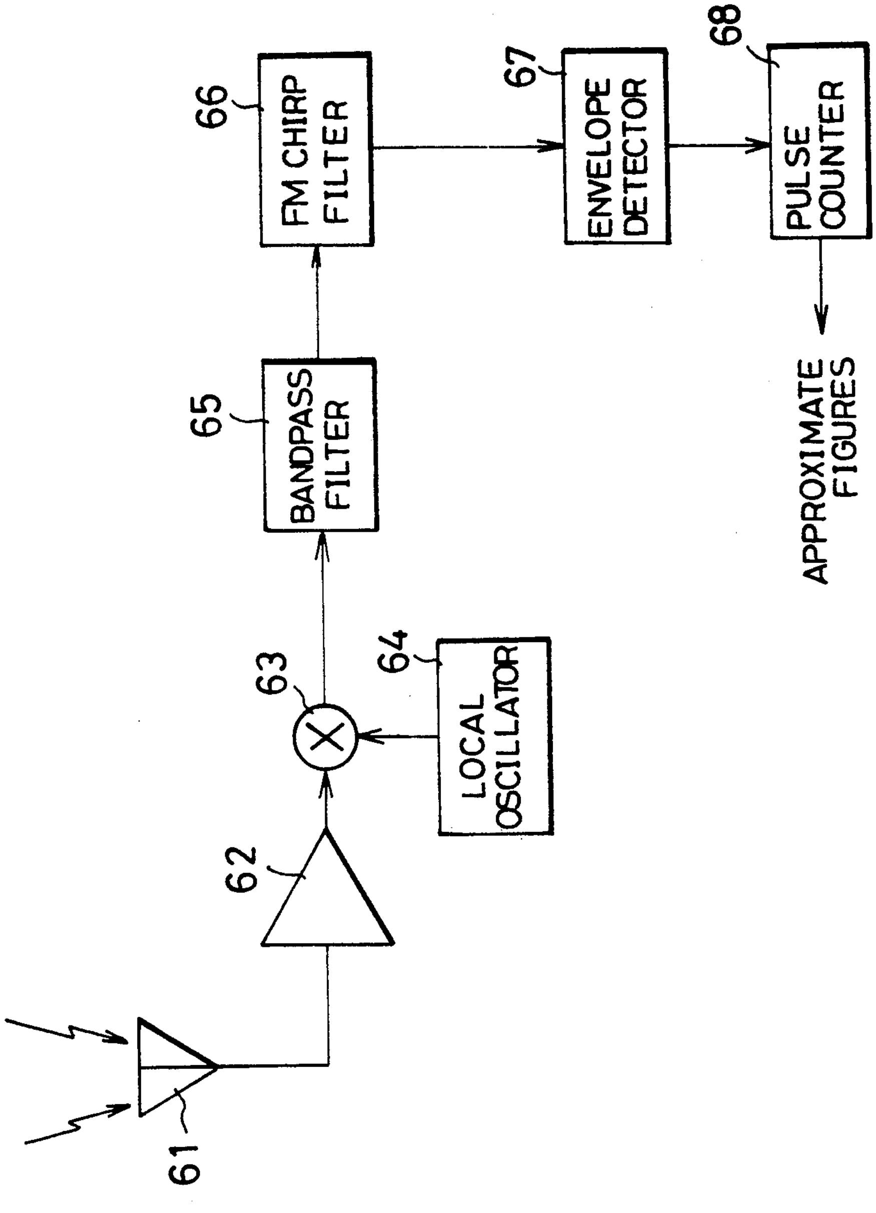
FIG. 13 is a block diagram of a further embodiment of the receiving device which receives the FM chirp signal in accordance with the present invention.

FIG. 13 illustrates a block diagram of the signal receiving device for receiving the FM chirp signal emitted from the transmission device of FIG. 10 mentioned above. The device comprises an antenna 61, an amplifier 62, a mixer 63, a local oscillator 64, and a bandpass filter 65 which are substantially the same as those in FIG. 2.

The device of FIG. 13 further comprises an FM chirp filter 66, an envelope detector 67 and a pulse counter 68.

Figure 14:
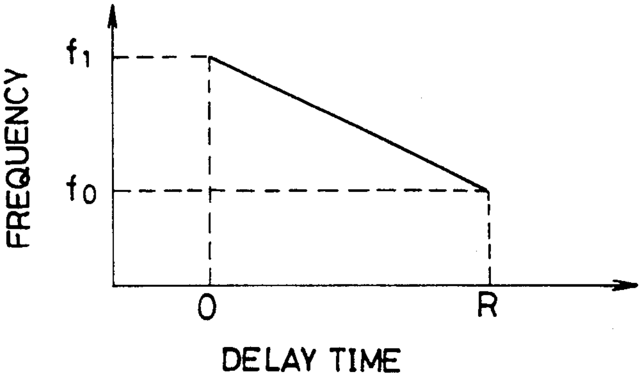
FIG. 14 is a graphical view of a characteristic of the FM chirp filter.

FIG. 14 illustrates the characteristics of the FM chirp filter 66. As can be seen from the graph of FIG. 14, the lower the frequency of the signal becomes, the longer the filter 66 gives the delay time to the signal that passes through the filter. The filter 66 may comprises, for example, an SAW (Surface Acoustic Wave) delay element as disclosed in "Acoustic Waves" (Prentice-hall 1987) by G. S. Kino, page 332 to 333.

Figure 15:
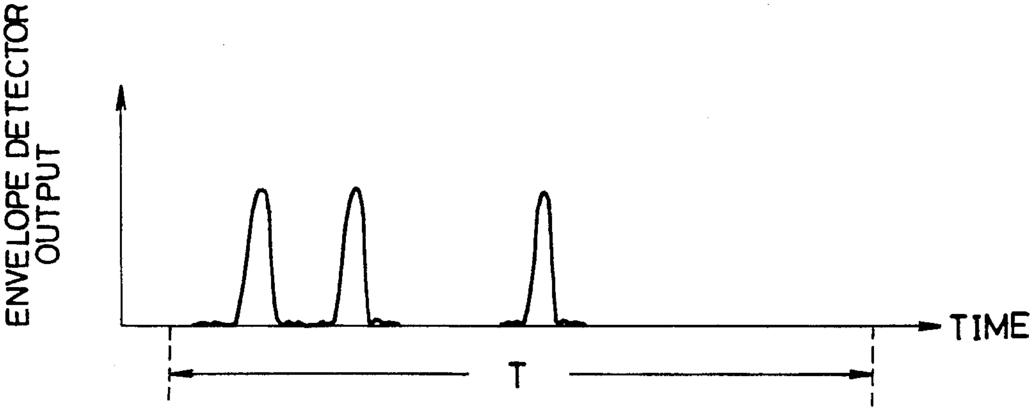
FIG. 15 is a graphical view of pulses constituted from the envelope lines of the output from the FM chirp filter.

Therefore, when the FM chirp signal output from the bandpass filter 65 passes through the FM chirp filter 66, the low frequency signal component in the first part of the period R is delayed longer than the high frequency signal component in the last part of the period R. Accordingly, the envelope of the FM chirp signal is compressed, as explained with reference to FIG. 3*b* before, so that the width of the pulse detected by the circuit 67 becomes narrow, as illustrated in FIG. 15.

As a result, when a plurality of FM chirp signals are overlappingly transmitted to the receiving device from the objects, the pulses of the FM chirp signals are narrowed and separated from each other so that the pulses can be accurately counted by the pulse count circuit 68, whereby the approximate figures of the objects are reliably measured.

Many widely different embodiments of the present invention maybe constructed without departing from the spirit and scope of the present invention. It should be understood that the present invention is not limited to the specific embodiments described in the specification, except as defined in the appended claims.

What is claimed is:

1. A system for measuring an approximate number among a number of known objects in a particular place, comprising:

a signal transmission means arranged in each of the objects to be measured for emitting a PN signal of a specific group, wherein a peak of the PN signal can be generated at a receiving device in a predetermined period; and a signal receiving means for receiving the PN signal transmitted from said signal transmission means, said signal receiving means having a peak detection means and a calculation means for obtaining an output corresponding to the quantity of the peaks of the PN signal emitted from said objects and for counting the peaks of self-correlation of the PN signal.

2. A system according to claim 1, wherein said calculation means sums an energy level of peaks of self-correlation of the PN signal.

3. A system according to claim 1, wherein said peak detection means includes a bandpass filter, a matched filter and an envelope detector connected in series.

4. A system according to claim 3, wherein said peak detection means further includes a threshold circuit connected to said envelope detector.

5. A system according to claim 1, wherein said peak detection means outputs a pulse series, each pulse corresponding to a respective peak of the PN signal.

6. A system according to claim 5, wherein said calculation means includes an integrator which integrates the pulses for a predetermined period.

7. A system according to claim 5, wherein said calculation means includes a counter circuit which counts the pulses.

8. A system according to claim 1, wherein a plurality of the PN signals of different groups are arranged for different sorts of object, respectively.

9. A system for measuring an approximate number among a number of known objects in a particular place, comprising:

a signal transmission means arranged in each of the objects to be measured for emitting an FM chirp signal, wherein a peak of the FM chirp signal can be generated at a receiving device in a predetermined period; and a signal receiving means for receiving the FM chirp signal transmitted from said signal transmission means, said signal receiving means having a peak detection means and a calculation means for obtaining an output corresponding to the quantity of the peaks of the FM chirp signal emitted from said objects and for counting the peaks of self-correlation of the FM chirp signal.

10. A system according to claim 9, wherein said peak detection means outputs a pulse series, each pulse corresponding to a respective peak of the FM chirp signal, and includes a bandpass filter, an FM chirp filter and an envelope detector connected in series.

11. A system according to claim 10, wherein said calculation means includes a pulse counter which counts the pulses outputted from said peak detection means.

12. A system for measuring an approximate number along a number of known objects in a particular place, comprising:

a signal transmission means arranged in each of the objects to be measured for emitting a predetermined signal of a specific group, wherein a peak of the predetermined signal can be generated at a receiving device in a predetermined period; and signal receiving means for receiving the predetermined signal transmitted from said signal transmission means, said signal receiving means having a peak detection means and a calculation means for obtaining an output corresponding to the quantity of the peaks of the predetermined signal emitted from said objects and for counting the peaks of self-correlation of the predetermined signal.

13. A system according to claim 12, wherein said peak detection means outputs a pulse series, each pulse corresponding to a respective peak of the predetermined signal, and includes a bandpass filter, a filter means and an envelope detector connected in series.

14. A system according to claim 13, wherein said calculation means includes a pulse counter which counts the pulses outputted from said peak detection means.

* * * * *